United States Patent
Nishimura et al.

(10) Patent No.: US 11,623,260 B2
(45) Date of Patent: Apr. 11, 2023

(54) FORMED BODY, STRUCTURAL MEMBER, AND METHOD FOR PRODUCING FORMED BODY

(71) Applicant: NIPPON STEEL CORPORATION, Tokyo (JP)

(72) Inventors: Ryuichi Nishimura, Tokyo (JP); Yoshiaki Nakazawa, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 755 days.

(21) Appl. No.: 16/493,933

(22) PCT Filed: Mar. 15, 2017

(86) PCT No.: PCT/JP2017/010530
§ 371 (c)(1),
(2) Date: Sep. 13, 2019

(87) PCT Pub. No.: WO2018/167896
PCT Pub. Date: Sep. 20, 2018

(65) Prior Publication Data
US 2020/0130037 A1 Apr. 30, 2020

(51) Int. Cl.
*B21D 5/16* (2006.01)
*F16B 5/08* (2006.01)
(Continued)

(52) U.S. Cl.
CPC ............. *B21D 5/16* (2013.01); *B62D 27/023* (2013.01); *F16B 5/0008* (2013.01); *B60R 19/565* (2013.01); *B62D 25/025* (2013.01)

(58) Field of Classification Search
CPC ... B21D 5/04; B21D 5/06; B21D 5/08; B21D 5/086; B21D 5/10; B21D 5/16; F16B 5/0008; B62D 25/04; B60Y 2410/12
(Continued)

(56) References Cited

U.S. PATENT DOCUMENTS 7,758,107 B2 *  7/2010  Ratsos ................... B62D 25/06
                                                296/187.05
2010/0026053 A1  2/2010  Ratsos et al.
(Continued)

FOREIGN PATENT DOCUMENTS

CN        105492136 A      4/2016
DE  10 2009 027 649 A1    2/2010
(Continued)

OTHER PUBLICATIONS

Machine translation of JP-2016159813-A, published on Sep. 5, 2016.
(Continued)

*Primary Examiner* — Dennis H Pedder
(74) *Attorney, Agent, or Firm* — Birch, Stewart, Kolasch & Birch, LLP

(57) ABSTRACT

A formed body 1 includes a first flange 3, a body portion 100 (a first vertical wall portion 4, a top plate portion 5, a second vertical wall portion 6), and a second flange 7, and the formed body 1 is made of steel having tensile strength of 440 MPa or more. The first flange 3 extends toward the second flange 7 from an edge portion of the first vertical wall portion 4. The first flange 3 and the body portion 100 curve so as to conform to each other as viewed from the direction orthogonal to the top plate portion 5.

17 Claims, 9 Drawing Sheets

(51) Int. Cl.
   *B62D 27/02* (2006.01)
   *F16B 5/00* (2006.01)
   *B60R 19/56* (2006.01)
   *B62D 25/02* (2006.01)

(58) Field of Classification Search
   USPC .......................................... 296/193.06, 205
   See application file for complete search history.

(56) References Cited

U.S. PATENT DOCUMENTS

| | | | |
|---|---|---|---|
| 2013/0062912 A1 | 3/2013 | Zörnack et al. | |
| 2015/0224563 A1* | 8/2015 | Aso ........................ | B62D 25/08 428/595 |
| 2016/0016610 A1 | 1/2016 | Okada et al. | |
| 2016/0243603 A1 | 8/2016 | Shinmiya et al. | |
| 2016/0257344 A1 | 9/2016 | Hasegawa et al. | |

FOREIGN PATENT DOCUMENTS

| | | | | |
|---|---|---|---|---|
| DE | 10 2010 016 474 A1 | 10/2011 | | |
| DE | 102010016474 | * 10/2011 | ............. | B62D 25/00 |
| JP | 2003-54445 A | 2/2003 | | |
| JP | 2011-206789 A | 10/2011 | | |
| JP | 2013-63462 A | 4/2013 | | |
| JP | 2015-431 A | 1/2015 | | |
| JP | 2015-44204 A | 3/2015 | | |
| JP | 2016-159813 A | 9/2016 | | |
| WO | WO 2014/042067 A1 | 3/2014 | | |
| WO | WO 2014/163203 A1 | 10/2014 | | |

OTHER PUBLICATIONS

English translation of the International Preliminary Report on Patentability and Written Opinion of the International Searching Authority (Forms PCT/IB/326, PCT/IB/373 and PCT/ISA/237) for Application No. PCT/JP2017/010530, dated Sep. 26, 2019.
1st Office Action for JP 2016-002602 dated Jul. 23, 2019.
International Search Report for PCT/JP2017/010530 dated May 23, 2017.

* cited by examiner

[Fig.1]
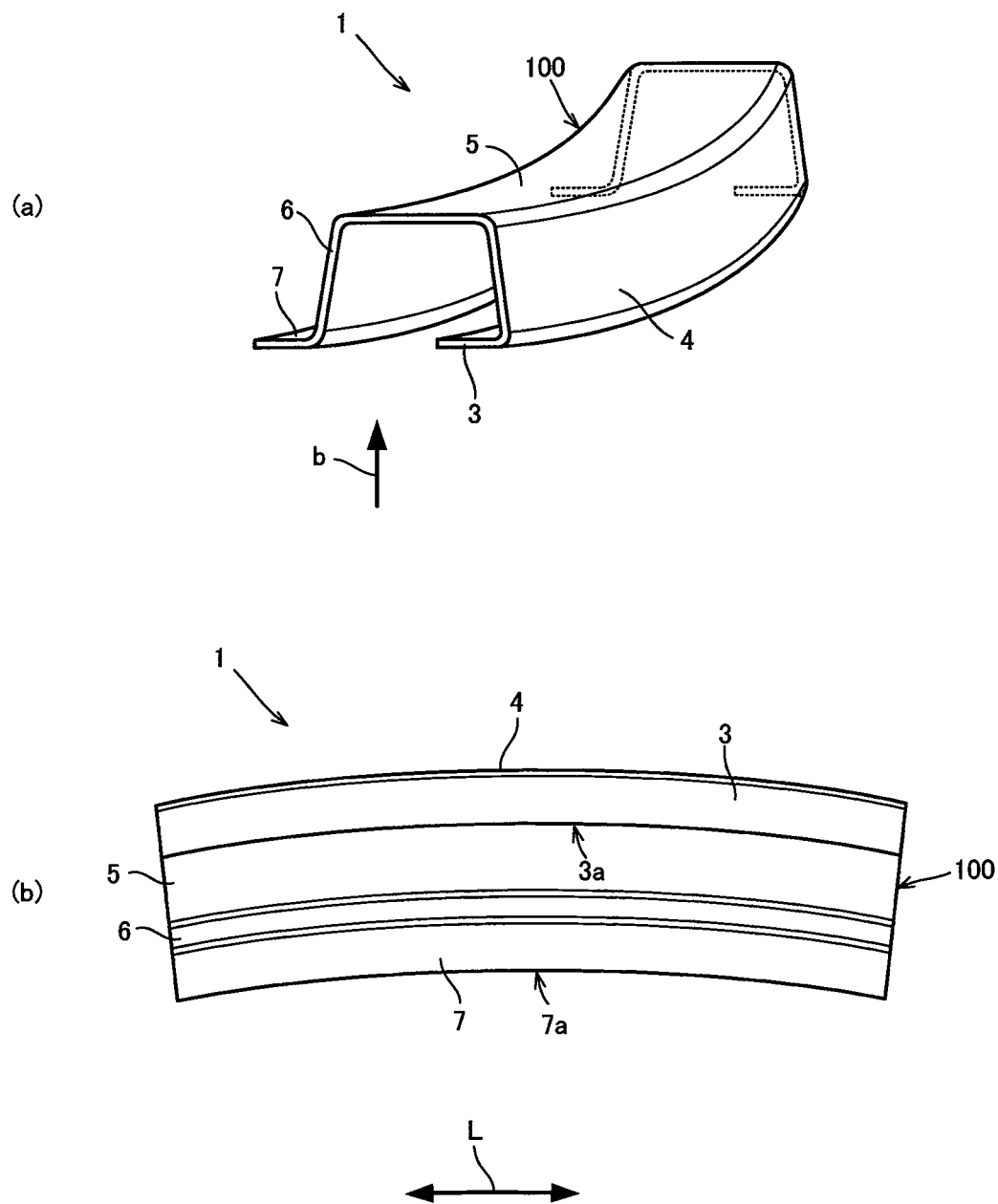

[Fig.2]
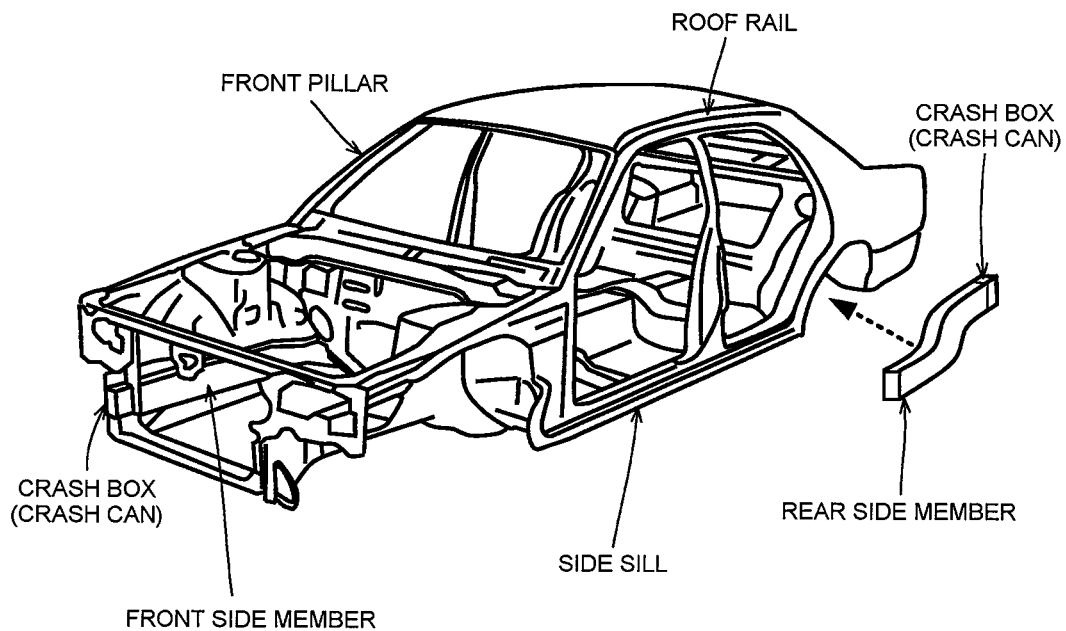
[Fig.3]
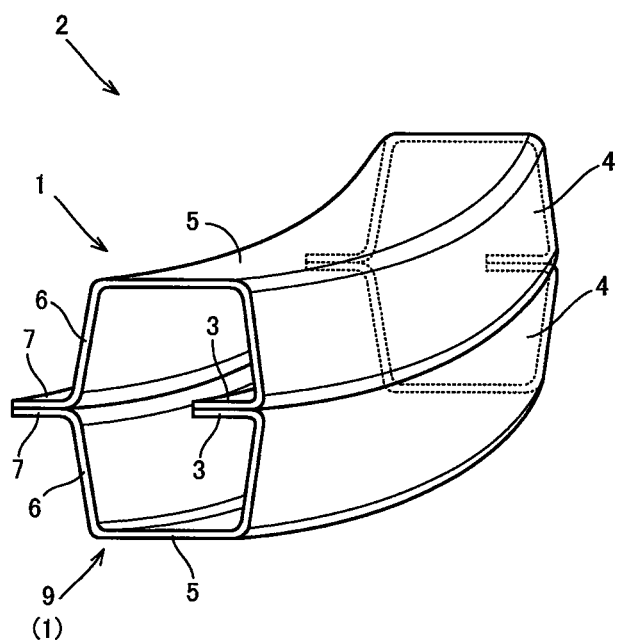

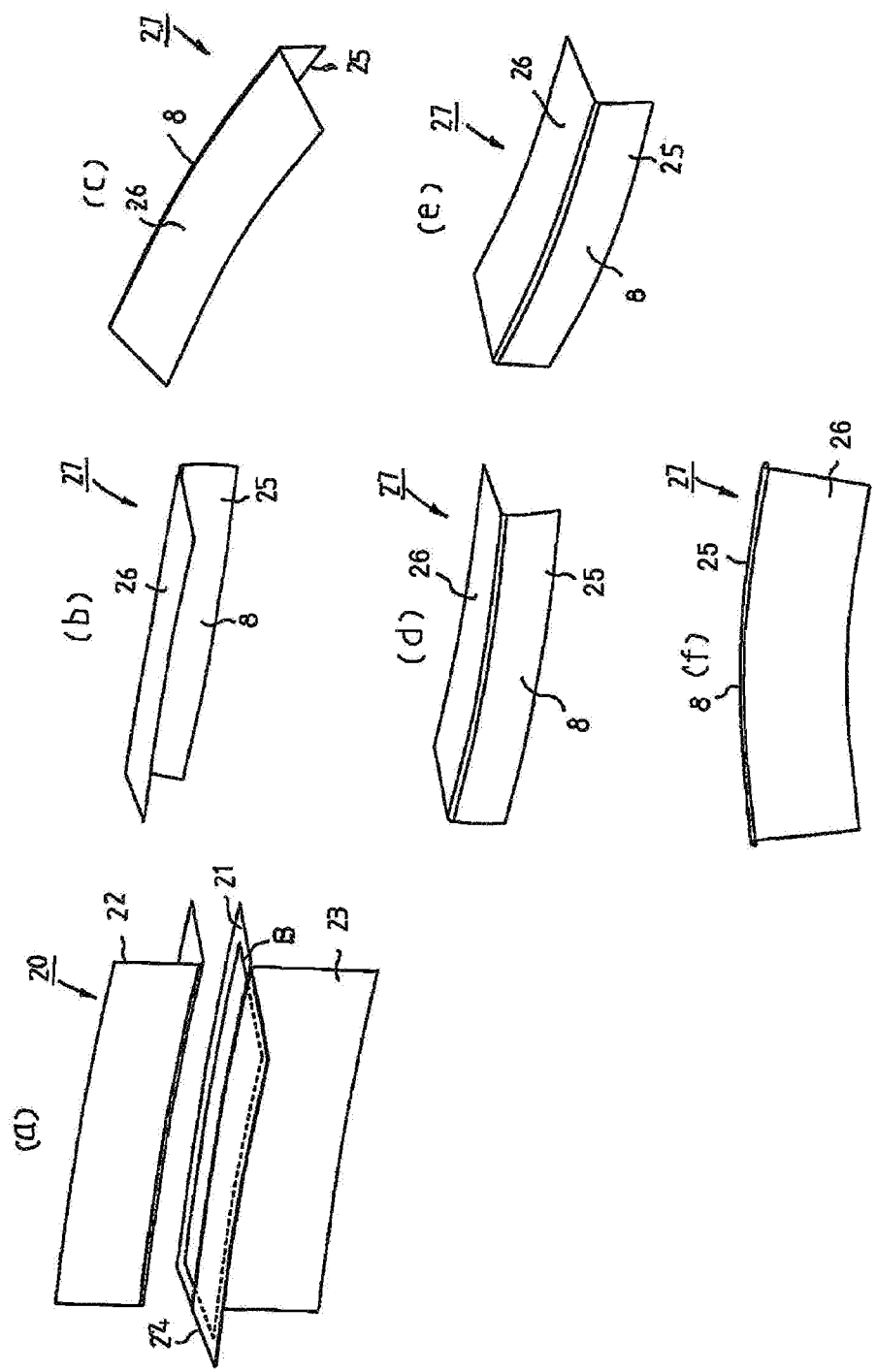
[Fig.4]

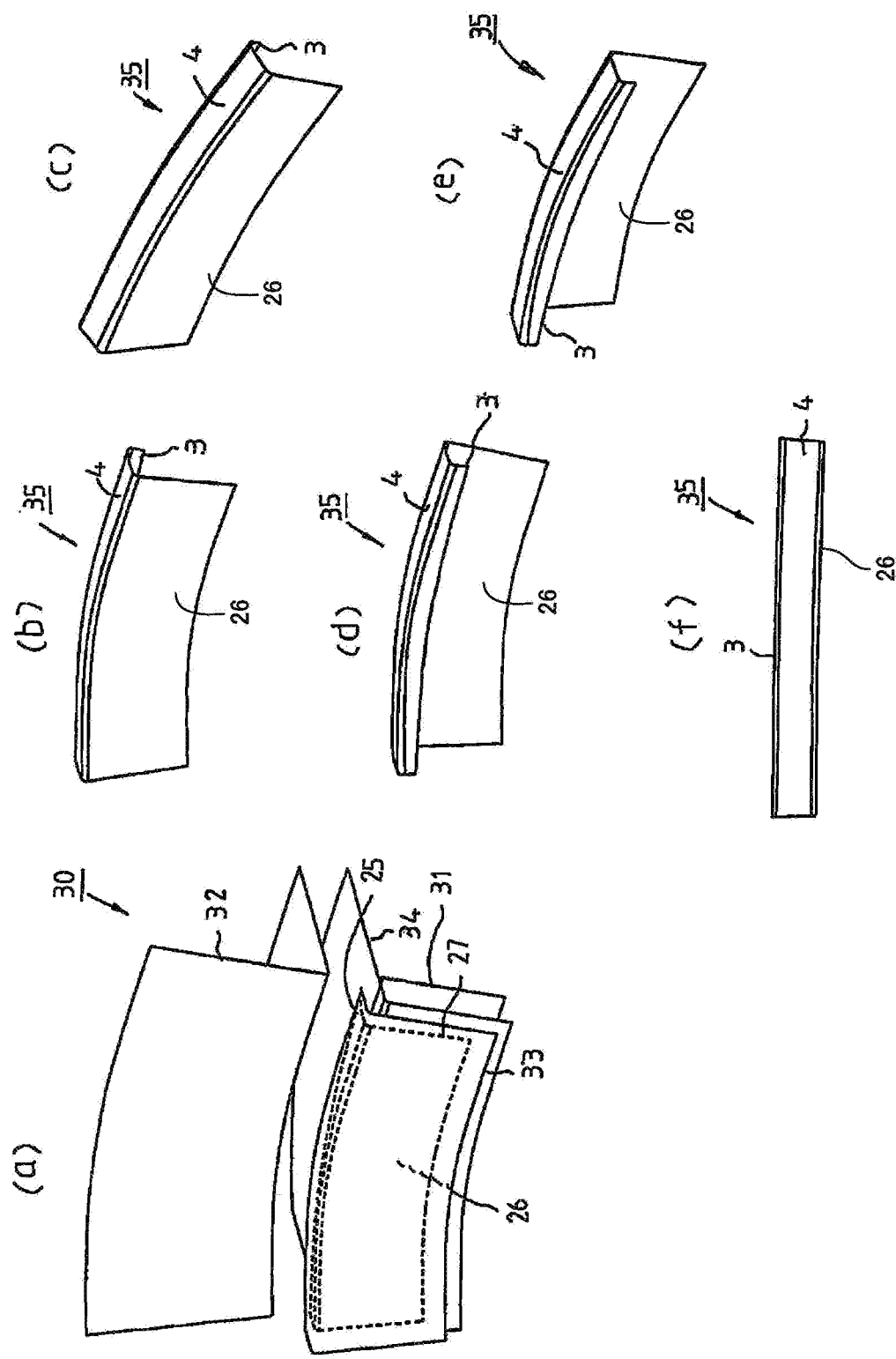

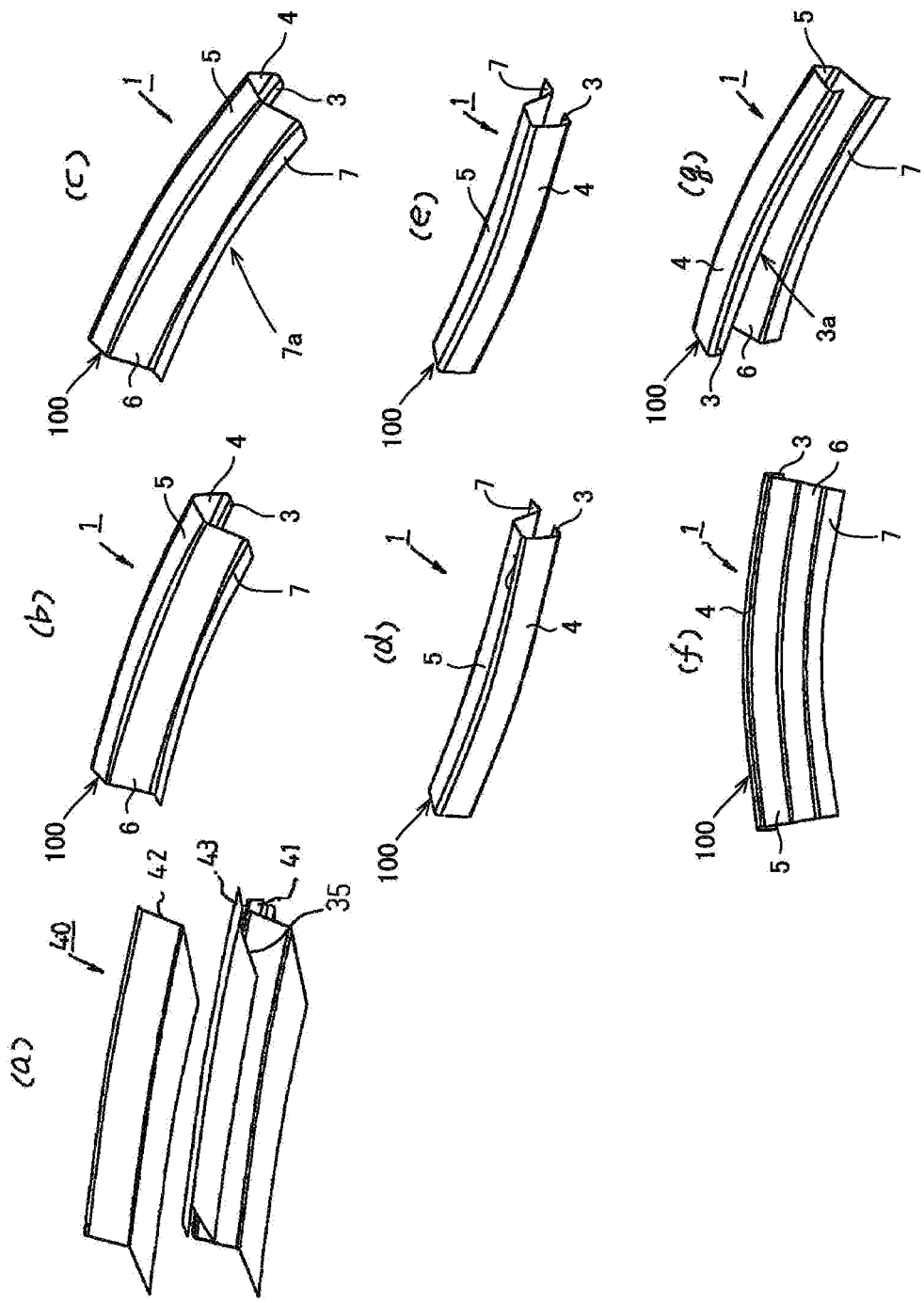
[Fig.6]

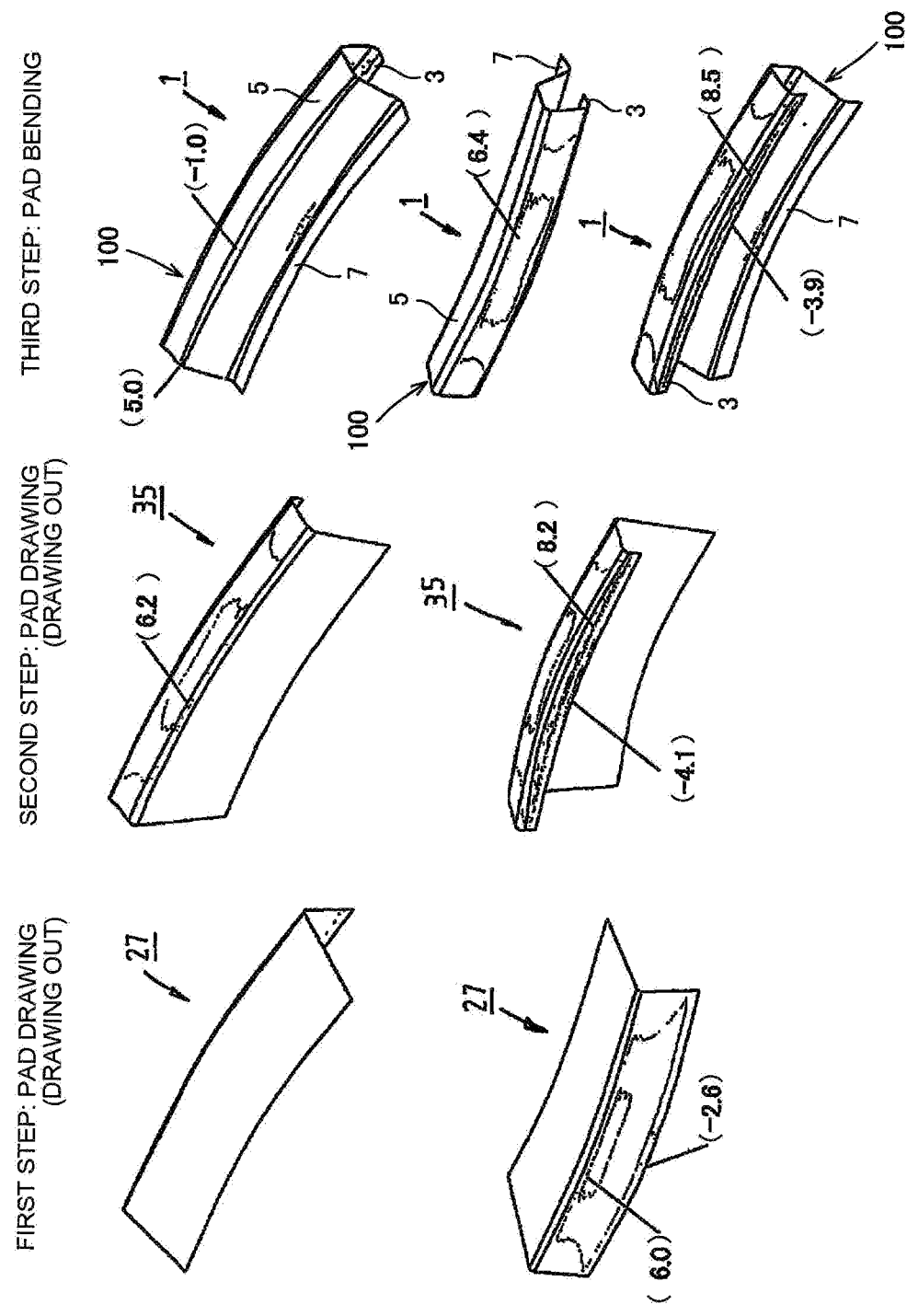

[Fig.8]
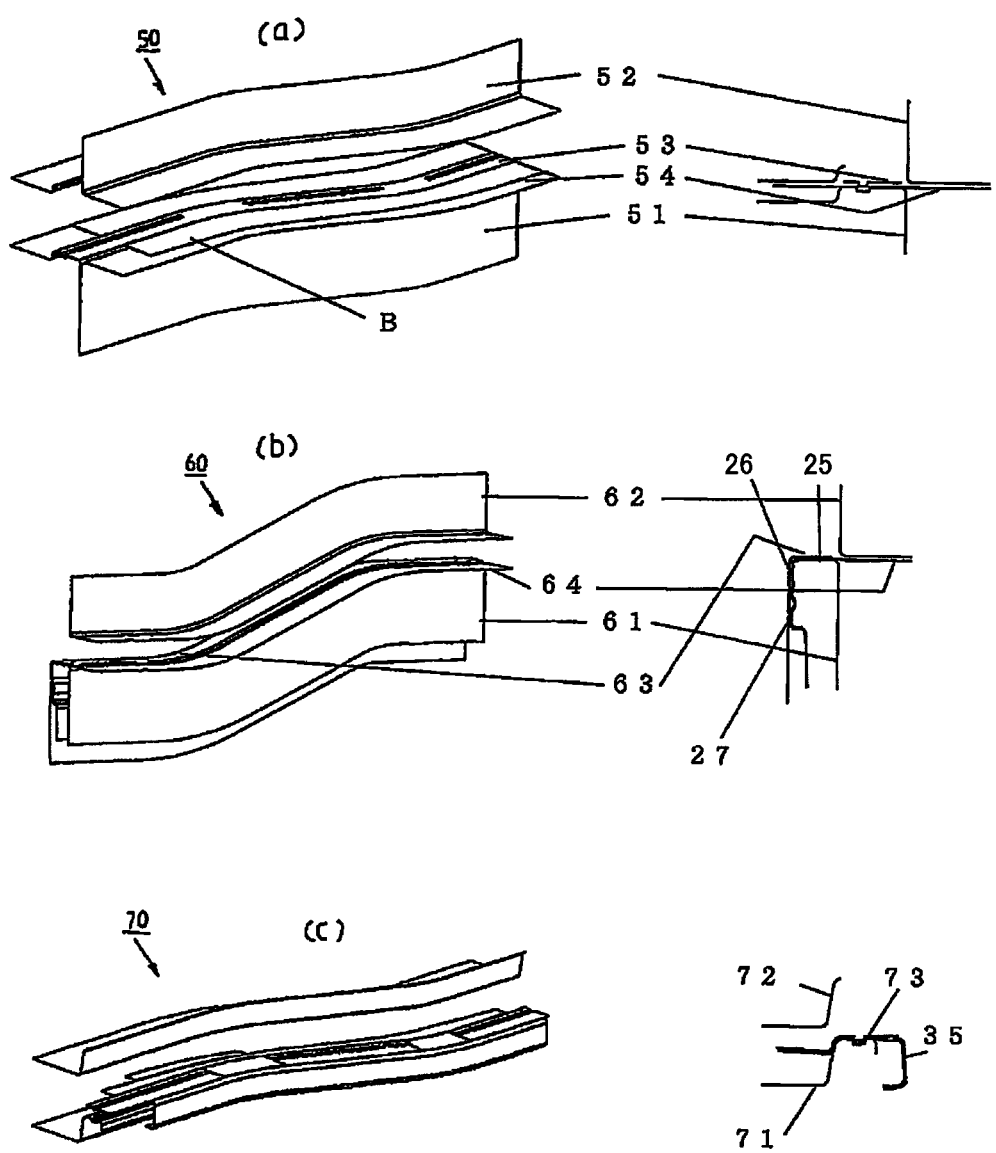

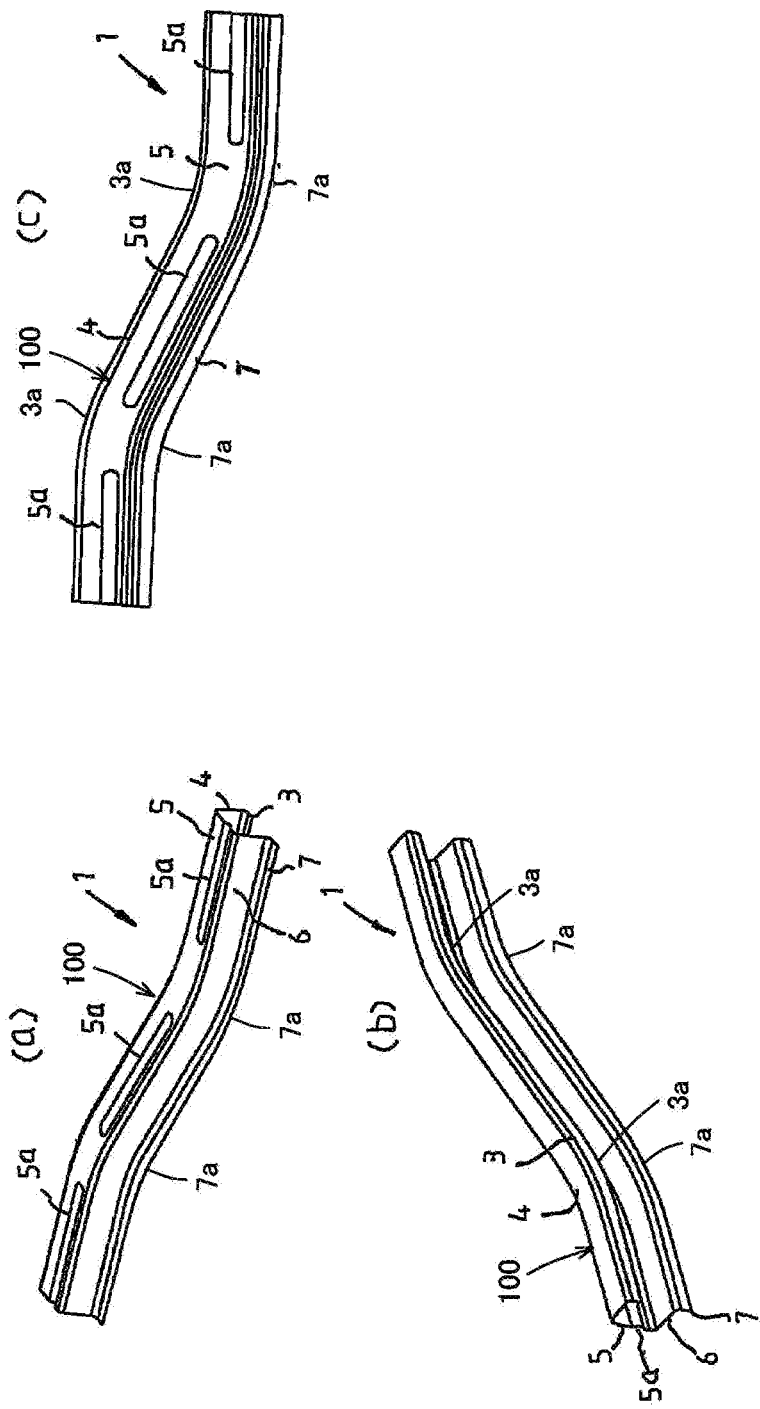

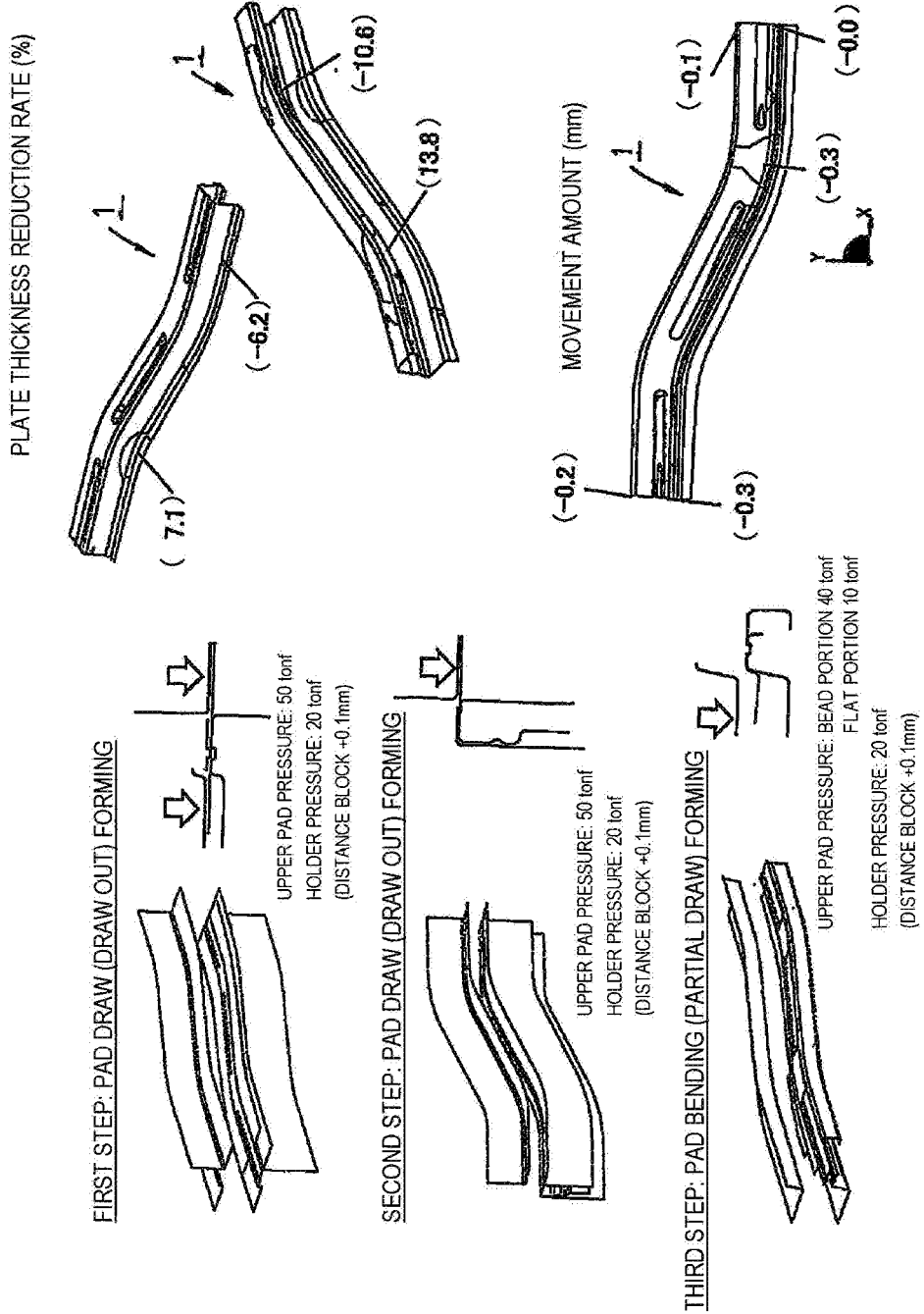
[Fig.10]

FORMED BODY, STRUCTURAL MEMBER, AND METHOD FOR PRODUCING FORMED BODY

TECHNICAL FIELD

The present invention relates to a formed body, a structural member which includes the formed body, and a method for producing the formed body.

BACKGROUND ART

Conventionally, from a viewpoint of reduction in weight of an automobile and improvement of safety, a formed body acquired by applying press forming to a difficult-to-process material having tensile strength of 440 MPa or more has been used as a structural member (a member forming a frame, for example) for a vehicle body.

For example, Patent Document 1 discloses a hollow structural member which is used as a structural member for an automobile. The hollow structural member disclosed in Patent Document 1 has a configuration where two members (hereinafter referred to as "components") each having an open cross-sectional shape are joined with each other. Each component includes an upper surface portion (or a bottom surface portion), a pair of side wall portions, and a pair of flanges. One flange is formed so as to extend from one edge of one side wall portion toward the other side wall portion, and the other flange is formed so as to extend from one edge of the other side wall portion toward the one side wall portion. In this hollow structural member, the pair of flanges of the one component and the pair of flanges of the other component are joined with each other.

LIST OF PRIOR ART DOCUMENTS

Patent Document

Patent Document 1: JP2003-54445A

SUMMARY OF INVENTION

Technical Problem

Patent Document 1 describes that appropriately adjusting the length and the like of joined portions of the flanges of the hollow structural member having the above-mentioned configuration can increase the amount of energy absorption of the hollow structural member during bending deformation.

However, inventors of the present invention have made various studies, and found the following. Even when a hollow structural member has the above-mentioned configuration, there may be a case where the hollow structural member cannot exhibit desired bending strength characteristics depending on a direction of a bending load applied to the hollow structural member.

It is an objective of the present invention to provide a formed body having excellent rigidity with respect to bending deformation, a structural member, and a method for producing the formed body.

Solution to Problem

Patent Document 1 described above describes that the flange on both sides or on one side is formed of an inwardly directed flange so that bending load characteristics are changed, thus increasing the amount of energy absorption whereby it is possible to produce a hollow structural member excellent in impact absorption capacity without increasing costs. However, the hollow structural member described in Patent Document 1 is formed into a straight shape as a whole. Accordingly, in using the hollow structural member as a structural member, a use range of the hollow structural member is limited. The use range of the hollow structural member is reduced particularly in the case where the above-mentioned hollow structural member is used as a structural member of a streamlined vehicle body of an automobile.

In view of the above, to expand the use range of the formed body, the inventors of the present invention have made studies in detail on a configuration where a formed body includes a body portion having an open cross-sectional shape and a pair of flanges connected to both edges of the body portion, and the body portion of the formed body is curved. As a result, the following is found. By forming a formed body such that at least one flange is formed of an inwardly directed flange and, further, the inwardly directed flange is curved along the body portion, the formed body can acquire excellent rigidity with respect to bending deformation.

The inventors of the present invention have made extensive studies also on a method for producing the formed body. As a result, the inventors of the present invention have acquired the following findings A to C.

(A) When an attempt is made to form a formed body which includes an inwardly directed flange with the general press forming method of using a punch and a die, the inwardly directed flange should be formed in a press forming direction. Accordingly, the inwardly directed flange cannot be formed with the conventional press forming method.

(B) In a formed body where a body portion and a pair of flanges are formed into a straight shape, elongation and contraction may not be generated in the longitudinal direction in either of the body portion and the flanges at the time of acquiring the formed body by processing a blank. Accordingly, the formed body can be shaped only with elongation (plastic deformation) which is generated in a cross section perpendicular to the longitudinal direction. On the other hand, in a formed body where a body portion and flanges are curved, elongation and contraction are generated in the longitudinal direction in both the body portion and the flanges at the time of acquiring the formed body by processing a blank. Accordingly, it is difficult to acquire, using a conventional production method, a formed body having a desired shape where the body portion and the flanges are curved.

(C) A formed body which includes an inwardly directed flange can be produced such that a formed body pressing step is divided into a plurality of steps, and press forming is performed using a press forming method (various bend forming, draw forming) suitable for each forming portion in the optimum order. Specifically, a processing step is divided in the width direction of a longer-length blank, and the structure of a press forming tools to be used is changed to a structure which can use pad drawing and pad bending in combination so as to control an increment of strain in the blank during press forming. With such a configuration, it is possible to produce a formed body which includes the inwardly directed flange from a blank having tensile strength of 440 MPa or more.

The present invention has made based on the above-mentioned findings.

The present invention is as follows.

(1) A formed body made of steel having tensile strength of 440 MPa or more, the formed body including:

a body portion having an open cross-sectional shape, the body portion including a top plate portion, a first vertical wall portion provided continuously to one edge portion of the top plate portion in a width direction, and a second vertical wall portion provided continuously to the other edge portion of the top plate portion in the width direction;

a first flange provided continuously to an edge portion of the first vertical wall portion opposite to the top plate portion; and a second flange provided continuously to an edge portion of the second vertical wall portion opposite to the top plate portion, wherein at least one flange of the first flange and the second flange extends toward the other flange of the first flange and the second flange from the first vertical wall portion or from the second vertical wall portion, and the body portion and the at least one flange curve so as to conform to each other as viewed from a direction orthogonal to the top plate portion.

(2) The formed body described in the above-mentioned (1), wherein the other flange of the first flange and the second flange curves so as to conform to the body portion as viewed from the direction orthogonal to the top plate portion.

(3) A structural member which includes the formed body described in the above-mentioned (1) or (2); and a joining member joined to the first flange and the second flange of the formed body such that the first flange and the second flange are connected.

(4) The structural member described in the above-mentioned (3), wherein the joining member is the formed body described in the above-mentioned (1) or (2), and the first flange of the one formed body and the first flange of the other formed body are joined with each other, and the second flange of the one formed body and the second flange of the other formed body are joined with each other.

(5) The structural member described in the above-mentioned (3) or (4), wherein the structural member is a front pillar, a roof rail, a front side member, a side sill, a rear side member, a crash box, or a crash can of a vehicle body.

(6) A method for producing the formed body described in the above-mentioned (1) or (2), the method including following first to third steps:

the first step where pad draw forming is performed on a longer-length blank made of steel having tensile strength of 440 MPa or more using a first punch, a first die, a first pad, and a first blank holder, thus producing a longer-length first intermediate formed product which includes a first portion and a second portion, the first portion being provided on one side of the blank in a width direction and including a curved portion, and the second portion being provided on the other side of the blank in the width direction and formed continuous with the first portion;

the second step where a pressing direction is rotated by 90 degrees from the pressing direction in the first step, and pad draw forming is performed using a second die and a second blank holder while a portion of the first portion of the first intermediate formed product is supported by a second punch and a second pad, thus producing a longer-length second intermediate formed product which includes the first flange, the first vertical wall portion, and the second portion which is formed continuously to the first vertical wall portion; and the third step where the pressing direction is rotated by 90 degrees from the pressing direction in the second step, thus setting the pressing direction to the same pressing direction as in the first step, pad bend forming is performed using a third die while a portion of the second portion of the second intermediate formed product in the width direction is supported by a third punch and a third pad, or pad draw forming is performed using a third die and a third blank holder while the portion is supported by a third punch and a third pad, thus forming the top plate portion which is formed continuously to the first vertical wall portion, the second vertical wall portion which is formed continuously to the top plate portion, and the second flange which is formed continuously to the second vertical wall portion.

(7) A formed body produced by the production method described in the above-mentioned (6).

Advantageous Effects of Invention

According to the present invention, it is possible to acquire a formed body and a structural member having excellent rigidity with respect to bending deformation.

BRIEF DESCRIPTION OF DRAWINGS

FIG. 1(a) is a perspective view showing a formed body according to one embodiment of the present invention, and FIG. 1(b) is a bottom view showing the formed body shown in FIG. 1(a).

FIG. 2 is a view showing a vehicle body which uses the formed body according to one embodiment of the present invention.

FIG. 3 is a perspective view showing a structural member according to one embodiment of the present invention.

FIG. 4(a) is an isometric view showing a press forming tools used in a first step, and FIG. 4(b) to FIG. 4(f) are isometric views of a first intermediate formed product produced in the first step as viewed from various directions.

FIG. 5(a) is an isometric view showing a press forming tools used in a second step, and FIG. 5(b) to FIG. 5(f) are isometric views of a second intermediate formed product produced in the second step as viewed from various directions.

FIG. 6(a) is an isometric view showing a press forming tools used in a third step, and FIG. 6(b) to FIG. 6(g) are isometric views of a formed body produced in the third step as viewed from various directions.

FIG. 7 is an explanatory view showing shapes and plate thickness reduction rates of the first intermediate formed product, the second intermediate formed product, and the formed body in the first to third steps.

FIG. 8(a) is a view showing the press forming tools used in the first step, FIG. 8(b) is a view showing the press forming tools used in the second step, and FIG. 8(c) is a view showing the press forming tools used in the third step.

FIG. 9(a) to FIG. 9(c) are isometric views of the formed body produced through the first to third steps as viewed from various directions.

FIG. 10 is an explanatory view collectively showing forming conditions in the first to third steps, plate thickness reduction rates (%) of respective portions of the produced formed body, and movement amounts (mm) of a material in a Y direction during forming.

DESCRIPTION OF EMBODIMENTS

Hereinafter, a formed body, a structural member, and a method for producing a formed body according to one embodiment of the present invention will be described with reference to accompanying drawings.

1. Configuration of Formed Body

FIG. 1(a) is a perspective view showing a formed body 1 according to one embodiment of the present invention, and FIG. 1(b) is a bottom view (a view as viewed from a direction indicated by an arrow b) showing the formed body 1 shown in FIG. 1(a).

The formed body 1 is a press-formed body made of steel having tensile strength of 440 MPa or more.

As shown in FIG. 1(a) and FIG. 1(b), the formed body 1 includes a body portion 100 having an open cross-sectional shape, a first flange 3, and a second flange 7. In this embodiment, the body portion 100 has a U shape in cross section, and includes a first vertical wall portion 4, a top plate portion 5, and a second vertical wall portion 6. The body portion 100 curves as viewed from a direction orthogonal to the top plate portion 5. In this embodiment, each of the first vertical wall portion 4, the top plate portion 5, and the second vertical wall portion 6 curves as viewed from the direction orthogonal to the top plate portion 5. The term "as viewed from a direction orthogonal to the top plate portion" may be rephrased as "as viewed from a direction perpendicular to the front surface or the rear surface of the top plate portion". The same applies for the description made hereinafter.

The first vertical wall portion 4 is provided continuously to the first flange 3. The top plate portion 5 is provided continuously to the first vertical wall portion 4. The second vertical wall portion 6 is provided continuously to the top plate portion 5. Further, the second flange 7 is provided continuously to the second vertical wall portion 6.

Referring to FIG. 1(a) and FIG. 1(b), in this embodiment, the first flange 3 extends toward the second flange 7 from the edge portion of the first vertical wall portion 4. In other words, the first flange 3 is an inwardly directed flange which extends toward the inside of the body portion 100. The first flange 3 includes a curved portion 3a which curves as viewed from a direction orthogonal to the top plate portion 5. The curved portion 3a curves along the body portion 100 as viewed from the direction orthogonal to the top plate portion 5. In this embodiment, the entire first flange 3 is formed as the curved portion 3a. In other words, in this embodiment, the body portion 100 and the first flange 3 curve so as to conform to each other as viewed from the direction orthogonal to the top plate portion 5. Accordingly, in this embodiment, an intersection line (boundary) between the first flange 3 and the first vertical wall portion 4 curves as viewed from the direction orthogonal to the top plate portion 5.

The second flange 7 extends in a direction away from the first flange 3 from the edge portion of the second vertical wall portion 6. In other words, the second flange 7 is an outwardly directed flange which extends toward the outside of the body portion 100. In the same manner as the first flange 3, the second flange 7 includes a curved portion 7a which curves as viewed from the direction orthogonal to the top plate portion 5. The curved portion 7a curves along the body portion 100 as viewed from the direction orthogonal to the top plate portion 5. In this embodiment, the entire second flange 7 is formed as the curved portion 7a. Accordingly, in this embodiment, an intersection line (boundary) between the second flange 7 and the second vertical wall portion 6 curve as viewed from the direction orthogonal to the top plate portion 5. As shown in FIG. 1(b), the first flange 3 (curved portion 3a), the second flange 7 (curved portion 7a), and the body portion 100 curve so as to conform to each other as viewed from the direction orthogonal to the top plate portion 5. In this embodiment, each of the first flange 3 (curved portion 3a), the second flange 7 (curved portion 7a), and the body portion 100 curves in an arc shape as viewed from the direction orthogonal to the top plate portion 5. Further, in this embodiment, the first flange 3 and the second flange 7 are provided parallel to the top plate portion 5. The curved portion includes not only a portion of the flange which curves in an arc shape with a uniform width, but also a portion of the flange having a varying width as viewed from a direction orthogonal to the top plate portion.

As described above, the first flange 3 is an inwardly directed flange, and the second flange 7 is an outwardly directed flange. In other words, both of the first flange 3 and the second flange 7 are formed to extend toward substantially the same direction from the body portion 100 in transverse cross section (in cross section orthogonal to the longitudinal direction of the formed body 1 (direction indicated by an arrow L)).

As described above, the formed body 1 can be acquired by forming an inwardly directed flange on a longer-length blank (sheet) which is a difficult-to-process material, and which has tensile strength of 440 MPa or more. Such a formed body 1 allows reduction in the size of the cross section, and has excellent cross-sectional efficiency.

Accordingly, as shown in FIG. 2, the formed body 1 can be preferably used as a structural member (for example, a front pillar, a roof rail, a front side member, a side sill, a rear side member, a crash box, or a crash can) of a vehicle body, for example. For example, using the formed body 1 for a front pillar (A pillar upper panel) can reduce a blind spot of a driver, thus increasing visibility of the driver. Further, for example, using the formed body 1 for a side member reduces interference of components mounted on a vehicle, thus increasing the degree of freedom in design of the vehicle. Accordingly, the bending mode of the side member at the time of collapse of the side member per se can be controlled and hence, crash performance of the vehicle can be improved.

It is preferable to use the formed body 1 according to this embodiment as a structural member such that the formed body 1 receives a bending load in the elongating direction of the first flange (inwardly directed flange) 3 (a direction directing from the edge portion of the first vertical wall portion 4 toward the second flange 7). When the formed body 1 receives a bending load in this manner, an in-plane shear force also acts on a flange surface, thus increasing deformation resistance. In other words, the formed body 1 according to this embodiment can acquire higher bending rigidity than a formed body having no inwardly directed flange.

In the above-mentioned embodiment, the description has been made with respect to the case where the inwardly directed flange curves so as to bulge in a projecting manner toward the outside of the body portion as viewed from the direction orthogonal to the top plate portion. However, the inwardly directed flange may curve so as to bulge in a projecting manner toward the inside of the body portion. In the above-mentioned embodiment, the description has been made with respect to the case where the outwardly directed flange curves so as to bulge in a projecting manner toward the inside of the body portion. However, the outwardly directed flange may curve so as to bulge in a projecting manner toward the outside of the body portion. In the above-mentioned embodiment, the description has been made with respect to the case where the first flange 3 is an inwardly directed flange. However, a configuration may be adopted where the first flange is formed as an outwardly directed flange, and the second flange is formed as an inwardly directed flange. Alternatively, both of the first flange and the second flange may be formed as inwardly directed flanges. Further, in the above-mentioned embodiment, the description has been made with respect to the case where the entire flange is set as a curved portion. However, it is sufficient that a curved portion is formed on at least a portion of the flange.

2. Configuration of Structural Member

FIG. 3 is a perspective view showing the structural member according to one embodiment of the present invention. As shown in FIG. 3, a structural member 2 according to this embodiment is a structural member which includes the above-mentioned formed body 1.

The formed body 1 is joined to a joining member 9 using the first flange 3 and the second flange 7 of the formed body 1 as joined portions and hence, the structural member 2 has a closed cross-sectional shape. In this embodiment, the formed body 1 is used as the joining member 9. In other words, in this embodiment, the structural member 2 includes a pair of formed bodies 1.

In the structural member 2 according to this embodiment, one first flange 3 and the other first flange 3 are made to overlap and joined with each other, and one second flange 7 and the other second flange 7 are made to overlap and joined with each other.

The structural member 2 shown in FIG. 3 merely forms one example of the structural member according to the present invention. The configuration of the joining member 9 may be different from the configuration of the formed body 1. For example, the joining member 9 may be a flat-plate-shaped closing plate.

3. Method for Producing Formed Body

The formed body 1 according to this embodiment is produced through the following first to third steps, for example, so that the formed body 1 can be produce at a low cost while an increase in production cost is suppressed. Hereinafter, the description will be made with respect to a case where the formed body 1 is used as (1) an A pillar upper panel (front pillar), and a case where the formed body 1 is used as (2) a side member.

(1) A pillar upper panel
(1-1) First Step

FIG. 4 is an explanatory view showing a case of producing the formed body 1 used as an A pillar upper panel, wherein FIG. 4(a) is an isometric view showing a press forming tools 20 used in a first step, and FIG. 4(b) to FIG. 4(f) are isometric views of a first intermediate formed product 27 produced in the first step as viewed from various directions.

In the first step, a longer-length blank B made of steel having tensile strength of 440 MPa or more (980 MPa, for example) and a sheet thickness of 1.4 mm, for example, is subjected to pad draw forming using a first blank holder 21, a first die 22, a first punch 23, and a first pad 24. In this pad draw forming, a distance block of +0.1 mm may be provided to the first blank holder 21.

With such pad draw forming, a longer-length first intermediate formed product 27 is produced which includes a first portion 25 provided to one side of the blank B in the width direction, and a second portion 26 provided to the other side of the blank B in the width direction and formed continuous with the first portion 25. The first portion 25 includes a curved portion 8. The curved portion 8 is a portion which curves so as to project toward the outside. In this embodiment, pad draw forming is performed such that the entire first portion 25 forms the curved portion 8. In this embodiment, the first portion 25 and the second portion 26 curve so as to conform to each other when viewed from a direction orthogonal to the second portion 26 (a direction perpendicular to the front surface or the rear surface of the second portion 26).

(1-2) Second Step

FIG. 5 is an explanatory view showing a case of performing pad draw forming in a second step, wherein FIG. 5(a) is an isometric view showing a press forming tools 30 used in the second step, and FIG. 5(b) to FIG. 5(f) are isometric views of a second intermediate formed product 35 produced in the second step as viewed from various directions.

In the second step, the pressing direction is rotated by 90 degrees from the pressing direction in the first step, and pad draw forming is performed using a second die 32 and a second blank holder 34 while a portion of the first portion 25 of the first intermediate formed product 27 is supported by a second punch 31 and a second pad 33. With such pad draw forming, a longer-length second intermediate formed product 35 is produced which includes a first flange 3, a first vertical wall portion 4, and a second portion 26 which is formed continuously to the first vertical wall portion 4.

(1-3) Third Step

FIG. 6 is an explanatory view showing a case of performing pad bend forming in a third step, wherein FIG. 6(a) is an isometric view showing a press forming tools 40 used in the third step, and FIG. 6(b) to FIG. 6(g) are isometric views of the formed body (A pillar upper panel) 1 produced in the third step as viewed from various directions.

In the third step, the pressing direction is rotated by 90 degrees from the pressing direction in the second step, thus setting the pressing direction to the same pressing direction as in the first step. Then, pad bend forming is performed using a third die 42 while a portion of the second portion 26 of the second intermediate formed product 35 in the width direction is supported by a third punch 41 and a third pad 43.

In a case where there is a concern of occurrence of wrinkles or excessive thickness on the second intermediate formed product 35 during the pad bend forming, pad draw forming may be performed instead of the pad bend forming in order to suppress the amount of inflow of a material.

With such forming, the first flange 3, the first vertical wall portion 4, the top plate portion 5, the second vertical wall portion 6, and the second flange 7 are formed. The formed body (A pillar upper panel) 1 according to one embodiment of the present invention is produced by press forming in this manner.

FIG. 7 is an explanatory view showing the shapes and plate thickness reduction rates of the first intermediate formed product 27, the second intermediate formed product 35, and the formed body (A pillar upper panel) 1 in the above-mentioned first to third steps. A number in parentheses in FIG. 7 indicates a plate thickness reduction rate (%) at a position indicated by the number. The plate thickness reduction rates shown in FIG. 7 are results acquired by performing a finite element analysis. Specifically, a forming analysis was performed which uses a finite element analysis code of a dynamic explicit method so as to analyze a plate thickness reduction rate after forming. Material characteristics of a 980 MPa-class composite-structure steel plate were adopted for the analysis.

As shown in FIG. 7, the formed body (A pillar upper panel) 1 produced as described above includes the first flange 3, the second flange 7, and the body portion 100 which curve so as to conform to each other as viewed from the direction orthogonal to the top plate portion 5. Further, the plate thickness reduction rate of the first intermediate formed product 27 falls within a range from 6.0 to −2.6%, and the plate thickness reduction rate of the second intermediate formed product 35 falls within a range from 8.2 to −4.1%. Further, the plate thickness reduction rate of the formed body (A pillar upper panel) 1 falls within a range from 8.5 to −3.9%.

For the purpose of comparison, an analysis was performed in the same manner also on a case where a formed body is produced using a conventional method which falls outside the production conditions defined in the present invention. An analysis was performed on cases which use a conventional method, that is, a case where so-called draw forming is performed and a case where so-called bending processing is performed. In the draw forming, processing is performed using a press forming tools which includes a die, a punch, and a wrinkle presser (holder) while a material to be processed is sandwiched by the die and the holder. In the bending processing, a press forming tools which includes a die, a punch, a lower die, and an upper pad is used, and bending is performed by the die while a material to be processed is pushed to the punch by the upper pad.

As a result, it is found that the inwardly directed flange cannot be stably processed using the conventional method. It is also found that the die shoulder causes elongation or contraction deformation in the flange. It is also found that the plate thickness reduction rate of the flange part falls within a range from 25 to −20% so that there is a possibility of occurrence of cracks and excessive wrinkles. However, according to the production method of the embodiment of the present invention, as described above, the plate thickness reduction rate can be suppressed to a value which falls within a range from 8.5 to −3.9%. In other words, it is found that the formed body (A pillar upper panel) 1 can be produced without occurrence of cracks or wrinkles with the above-mentioned first to third steps.

(2) Side Member
(2-1) First Step

FIG. 8 is an explanatory view showing the case of producing the formed body 1 used as a side member, wherein FIG. 8(a) shows a press forming tools 50 used in a first step, FIG. 8(b) shows a press forming tools 60 used in a second step, and FIG. 8(c) shows a press forming tools 70 used in a third step.

FIG. 9(a) to FIG. 9(c) are isometric views of the formed body 1 produced through the first to third steps as viewed from various directions. Beads 5a are formed on a top plate 5 of this formed body 1.

Further, FIG. 10 is an explanatory view collectively showing forming conditions in the first to third steps, plate thickness reduction rates (%) of respective portions of the produced formed body 1, and movement amounts (mm) of a material in the Y direction during forming. A number in parentheses in FIG. 10 indicates a plate thickness reduction rate (%) or a movement amount (mm) in the Y direction at a position indicated by the number. The above-mentioned plate thickness reduction rate and movement amount in the Y direction are results acquired by performing a finite element analysis. Analysis conditions are equal to the analysis conditions in the case of the above-mentioned A pillar upper panel.

As shown in FIG. 8(a), in the first step, a longer-length blank B made of steel having tensile strength of 440 MPa or more (980 MPa, for example) and a sheet thickness of 1.4 mm, for example, is subjected to pad draw forming using a first punch 51, a first die 52, a first pad 53, and a first blank holder 54. In this pad draw forming, a distance block of +0.1 mm may be provided between the first blank holder 54 and the first die 52.

As shown in FIG. 10, in the first step (in a step performed first), for example, the pad pressure of the first pad 53 (upper pad pressure) is set to 50 tonf, and the holder pressure of the first blank holder 54 is set to 20 tonf.

Referring to FIG. 8(b), with the above-mentioned pad draw forming, a longer-length first intermediate formed product 27 is produced which includes a first portion 25 provided to one side of the blank B in the width direction, and a second portion 26 provided to the other side of the blank B in the width direction and formed continuous with the first portion 25. In this embodiment, the first portion 25 includes a plurality of curved portions which curves in different directions.

(2-2) Second Step

As shown in FIG. 8(b), in the second step, the pressing direction is rotated by 90 degrees from the pressing direction in the first step, and pad draw forming is performed using a second die 62 and a second blank holder 64 while a portion of the first portion 25 of the first intermediate formed product 27 and the second portion 26 are supported by a second punch 61 and a second pad 63.

In this pad draw forming, for example, a distance block of +0.1 mm may be provided between the second blank holder 64 and the second die 62. In the second step, for example, the pad pressure of the second pad 63 (upper pad pressure) is set to 50 tonf, and the holder pressure of the second blank holder 64 is set to 20 tonf.

With such pad draw forming, a longer-length second intermediate formed product 35 is produced which includes a first flange 3, a first vertical wall portion 4, and the second portion 26 which is formed continuously to the first vertical wall portion 4.

(2-3) Third Step

As shown in FIG. 8(c), in the third step, the pressing direction is rotated by 90 degrees from the pressing direction in the second step, thus setting the pressing direction to the same pressing direction as in the first step. Then, pad bend forming is performed using a third die 72 while a portion of the second portion 26 of the second intermediate formed product 35 in the width direction is supported by a third punch 71 and a third pad 73. Alternatively, pad draw forming or pad bend forming is performed using the third die 72 and a third blank holder (not shown in the drawing) while the portion of the second portion 26 is supported by the third punch 71 and the third pad 73. FIG. 8(c) shows the case of the pad bend forming.

In a case where there is a concern of occurrence of wrinkles or excessive thickness on the second intermediate formed product 35 during pad bend forming, for example, pad draw forming is performed.

With such forming, the first flange 3, the first vertical wall portion 4, the top plate portion 5, the second vertical wall portion 6, and the second flange 7 are formed. In this manner, the formed body 1 having an external shape shown in FIG. 9(a) to FIG. 9(c) is produced by press forming.

As shown in FIG. 9(a) to FIG. 9(c), the formed body 1 produced as described above includes curved portions 3a, 7a. In other words, the formed body 1 includes the first flange 3, the second flange 7, and the body portion 100 which curve so as to conform to each other as viewed from the direction orthogonal to the top plate portion 5. Further, as shown in FIG. 10, the plate thickness reduction rate of the formed body 1 falls within a range from 13.8 to −10.6%. In other words, compared with the above-mentioned conventional method, a plate thickness reduction rate can be suppressed to a small range. With this plate thickness reduction rate, it is found that the formed body 1 can be produced without occurrence of cracks or wrinkles in the above-mentioned first to third steps.

(Advantageous Effects of Formed Body According to this Embodiment)

Compared with a formed body where a body portion is formed into a straight shape, a formed body where a body portion has a curved shape easily bends when a load is applied to the formed body in the longitudinal direction of the formed body (when a compression stress in the longitudinal direction is generated). Specifically, the formed body easily bends in a direction along which the radius of curvature of the curved portion reduces (hereinafter referred to as "curve direction"). Further, in the formed body which includes the body portion having a curved shape, the smaller the radius of curvature of the curved portion, the more bending deformation resistance is reduced at the time of bending in the curve direction. However, in the formed body 1 according to this embodiment, the first flange 3 and the second flange 7 are provided in the curve direction and hence, bending deformation resistance of the formed body 1 can be increased. Particularly, in this embodiment, the inwardly directed flange (first flange 3) is provided to the formed body 1 and hence, the second moment of area of the formed body 1 can be increased and hence, bending rigidity within the range of elastic deformation can be increased. Further, when a load in the curve direction acts on the formed body 1, thus causing the formed body 1 to be plastically deformed in the curve direction, tensile stress can be generated in the longitudinal direction in the first flange 3. Accordingly, it is possible to suppress that bending deformation locally occurs and hence, the formed body 1 can stably receive a load. In other words, an amount of energy absorption due to plastic deformation can be increased. As a result, the formed body 1 can acquire sufficient bending rigidity.

The formed body 1 according to this embodiment has the above-mentioned characteristics. Accordingly, the formed body 1 can be preferably used as a portion of a vehicle body which is required to receive a load in the curve direction of the formed body 1, for example.

INDUSTRIAL APPLICABILITY

According to the present invention, it is possible to acquire a formed body and a structural member for a vehicle body having excellent rigidity with respect to bending deformation.

REFERENCE SIGNS LIST

1 formed body
2 structural member
3 first flange
3a curved portion
4 first vertical wall portion
5 top plate portion
6 second vertical wall portion
7 second flange part
7a curved portion

The invention claimed is:

1. A formed body made of steel having tensile strength of 440 MPa or more, the formed body comprising:
 a body portion having an open cross-sectional shape, the body portion including a top plate portion, a first vertical wall portion provided continuously to one edge portion of the top plate portion in a width direction, and a second vertical wall portion provided continuously to the other edge portion of the top plate portion in the width direction;
 a first flange provided continuously to an edge portion of the first vertical wall portion opposite to the top plate portion; and
 a second flange provided continuously to an edge portion of the second vertical wall portion opposite to the top plate portion, wherein
 at least one flange of the first flange and the second flange extends toward the other flange of the first flange and the second flange from the first vertical wall portion or from the second vertical wall portion,
 at least the one flange includes a curved portion which curves as viewed from a direction orthogonal to the top plate portion, and
 the body portion and the at least one flange curve so as to conform to each other as viewed from the direction orthogonal to the top plate portion, and wherein
 a portion of the first vertical wall portion or the second vertical wall portion that is continuous with the curved portion is curved toward outside of the body portion as viewed from the direction orthogonal to the top plate portion, or
 a portion of the first vertical wall portion or the second vertical wall portion that is continuous with the curved portion is curved toward inside of the body portion as viewed from the direction orthogonal to the top plate portion.

2. The formed body according to claim 1, wherein the other flange of the first flange and the second flange curves so as to conform to the body portion as viewed from the direction orthogonal to the top plate portion.

3. A structural member comprising;
 the formed body according to claim 1; and a joining member joined to the first flange and the second flange of the formed body such that the first flange and the second flange are connected.

4. A structural member comprising a pair of the formed bodies according to claim 1, wherein
 the first flange of one formed body of the pair of the formed bodies and the first flange of the other formed body of the pair of formed bodies are joined with each other, and the second flange of the one formed body and the second flange of the other formed body are joined with each other.

5. A method for producing the formed body according to claim 1, the method comprising following first to third steps:
 the first step where pad draw forming is performed on a longer-length blank made of steel having tensile strength of 440 MPa or more using a first punch, a first die, a first pad, and a first blank holder, thus producing a longer-length first intermediate formed product which includes a first portion and a second portion, the first portion being provided on one side of the blank in a width direction and including a curved portion, and the second portion being provided on the other side of the blank in the width direction and formed continuous with the first portion;
 the second step where a pressing direction is rotated by 90 degrees from the pressing direction in the first step, and pad draw forming is performed using a second die and a second blank holder while a portion of the first portion of the first intermediate formed product is supported by a second punch and a second pad, thus producing a longer-length second intermediate formed product which includes the first flange, the first vertical wall portion, and the second portion which is formed continuously to the first vertical wall portion; and the third step where the pressing direction is rotated by 90 degrees from the pressing direction in the second step, thus setting the pressing direction to the same pressing direction as in the first step, pad bend forming is performed using a third die while a portion of the second portion of the second intermediate formed product in the width direction is supported by a third punch and a third pad, or pad draw forming is performed using a third die and a third blank holder while the portion is supported by a third punch and a third pad, thus forming the top plate portion which is formed continuously to the first vertical wall portion, the second vertical wall portion which is formed continuously to the top plate portion, and the second flange which is formed continuously to the second vertical wall portion.

6. A formed body produced by the production method according to claim 5.

7. A structural member comprising;
the formed body according to claim 2; and a joining member joined to the first flange and the second flange of the formed body such that the first flange and the second flange are connected.

8. A structural member comprising a pair of the formed bodies according to claim 2, wherein
the first flange of one formed body of the pair of the formed bodies and the first flange of the other formed body of the pair of the formed bodies are joined with each other, and the second flange of the one formed body and the second flange of the other formed body are joined with each other.

9. A method for producing the formed body according to claim 2, the method comprising following first to third steps:
the first step where pad draw forming is performed on a longer-length blank made of steel having tensile strength of 440 MPa or more using a first punch, a first die, a first pad, and a first blank holder, thus producing a longer-length first intermediate formed product which includes a first portion and a second portion, the first portion being provided on one side of the blank in a width direction and including a curved portion, and the second portion being provided on the other side of the blank in the width direction and formed continuous with the first portion;

the second step where a pressing direction is rotated by 90 degrees from the pressing direction in the first step, and pad draw forming is performed using a second die and a second blank holder while a portion of the first portion of the first intermediate formed product is supported by a second punch and a second pad, thus producing a longer-length second intermediate formed product which includes the first flange, the first vertical wall portion, and the second portion which is formed continuously to the first vertical wall portion; and the third step where the pressing direction is rotated by 90 degrees from the pressing direction in the second step, thus setting the pressing direction to the same pressing direction as in the first step, pad bend forming is performed using a third die while a portion of the second portion of the second intermediate formed product in the width direction is supported by a third punch and a third pad, or pad draw forming is performed using a third die and a third blank holder while the portion is supported by a third punch and a third pad, thus forming the top plate portion which is formed continuously to the first vertical wall portion, the second vertical wall portion which is formed continuously to the top plate portion, and the second flange which is formed continuously to the second vertical wall portion.

10. A formed body produced by the production method according to claim 9.

11. A front pillar of a vehicle body, comprising the formed body of claim 1.

12. A roof rail of a vehicle body, comprising the formed body of claim 1.

13. A front side member of a vehicle body, comprising the formed body of claim 1.

14. A side sill of a vehicle body, comprising the formed body of claim 1.

15. A rear side member of a vehicle body, comprising the formed body of claim 1.

16. A crash box of a vehicle body, comprising the formed body of claim 1.

17. A crash can of a vehicle body, comprising the formed body of claim 1.

* * * * *